Patented Sept. 11, 1945

2,384,751

UNITED STATES PATENT OFFICE 2,384,751

MONOAZO ACID DYESTUFFS

Arthur Howard Knight and William Elliot Stephen, Blackley, England, assignors to Imperial Chemical Industries Limited, a corporation of Great Britain No Drawing. Application September 17, 1942, Serial No. 458,733. In Great Britain October 8, 1941

1 Claim. (Cl. 260—199)

This invention relates to the manufacture of new monoazo acid dyestuffs and to their application to the colouring of animal fibres.

According to the invention we make the dyestuffs by diazotising an amine of the general formula

X—CO—NY—R—NH$_2$ in which R stands for a benzene nucleus which may be further substituted with simple azo dyestuff substituents, for example methyl, methoxy, or sulphonic acid groups, X stands for a monochloro- or monobromo-alkyl radical with not more than three carbon atoms, Y stands for hydrogen, alkyl (C$_1$ to C$_6$), aralkyl, cycloalkyl, alkoxyalkyl or aryl, and the primary amino group is in the meta or para position to the

X—CO—NY— group, and coupling the diazo compound so-obtained with a derivative of 2-amino-5-naphthol-7-sulphonic acid (J-acid), in which one H in the NH$_2$ group is replaced by a formyl, alkoxyformyl, succinyl, benzoyl or substituted benzoyl, arylsulphonyl, hydroaromatic sulphonyl or hydroaromatic carboxyl group or an acyl group of general formula —CO—(C$_n$H$_{2n}$)—O—B, wherein $n$ stands for 1, 2 or 3 and B for alkyl (C$_1$ to C$_4$), aryl, cycloalkyl or aralkyl, which aryl, cycloalkyl and aralkyl groups may contain nuclear substituents, for example, methyl or halogen, and the other H in the NH$_2$ group may be replaced by an alkyl or aryl group.

Also according to the invention we use the dyestuffs in colouring animal fibres, e. g., wool and silk.

The dyestuffs dye wool from an acid bath, various shades of orange being obtainable; the dyeings are characterised by very good fastness to severe washing and milling and good fastness to light.

The following are examples of diazo components which may be employed in accordance with the present invention:

4-amino-1-N-ethyl-omega-chloroacetanilide,
4-amino-1-N-isopropyl-omega-chloroacetanilide,
4-amino-1-N-n-butyl-omega-chloroacetanilide,
4-amino-2-N-ethyl-omega-chloroacet-toluidide,
4-amino-2-N-ethyl-omega-bromopropion - toluidide,
4-amino-2-N-ethyl-α-bromobutyryl-toluidine,
3-amino- omega - chloroacetanilide -4- sulphonic acid,
2-amino-4-N-ethyl-omega-chloroacet-toluidide,
4-amino-2-N-ethyl-α-bromopropiontoluidide,
4-amino-2-N-ethyl - omega - chloropropiontoluidide,
4-amino-1-N-ethyl-omega-chloropropionanilide,
4-amino-1-N-ethyl-omega-bromopropionanilide,
4-amino-1-N-sec-butyl-omega-chloroacetanilide,
4-amino - omega - chloroacetanilide-3-sulphonic acid,
4-amino-2-N-ethyl-omega-chloroacetanisidide,
4-amino-1-N-n-butyl-omega - chloroacetanilide-2-sulphonic acid,
4-amino-1-N-ethyl-omega-bromoacetanilide,
4-amino-1-N-benzyl-omega-chloroacetanilide,
4-amino-1-N-cyclohexyl-omega - chloroacetanilide,
5-amino-2-N-cyclohexyl-omega-chloroacet-toluidide,
3-amino-1-N-benzyl-omega-chloroacetanilide,
4-amino-2-N-benzyl-omega-chloroacet-toluidide,
4-amino-1-N-phenyl-omega-chloroacetanilide,
4-amino-1-N-cyclohexyl - omega-chloropropionanilide,
4-amino-1-N - cyclohexyl-omega-bromopropionanilide,
4-amino-1-N-cyclohexyl-α-bromopropionanilide,
4-amino-1-N-cyclohexyl - omega - bromoacetanilide, and
4-amino-2-N-benzyl-omega-chloroacetanisidide (obtainable by methods described in British Patent 544,409 or our U. S. Patent 2,346,492) and 4-amino-1-N-β-ethoxyethyl-omega- chloroacetanilide (obtainable by acetylating N-β-ethoxyethylaniline, nitrating, removing the acetyl group by hydrolysis, causing the resulting 4-nitro-1-N-β-ethoxyethylaniline to react with chloroacetyl chloride in boiling toluene and reducing the 4-nitro-1-N-β-ethoxyethyl-omega - chloroacetanilide thus obtained.

As examples of coupling components which can be employed according to the invention, we mention:

2-methoxyacetylamino-5-naphthol -7- sulphonic acid,
2-ethoxyacetylamino -5- naphthol -7- sulphonic acid
2-n-butoxyacetylamino -5- naphthol-7-sulphonic acid
2-N - ethyl-N-methoxyacetylamino-5-naphthol-7-sulphonic acid
2-N-phenyl-N-methoxyacetylamino-5-naphthol-7-sulphonic acid
2 - (phenoxyacetyl) - amino-5-naphthol-7-sulphonic acid
2-(2'-chlorophenoxyacetyl) - amino-5-naphthol-7-sulphonic acid 2-(4'-chlorophenoxyacetyl) - amino-5-naphthol-7-sulphonic acid
2-(4'-methylphenoxyacetyl)-amino -5-naphthol-7-sulphonic acid
2-(cyclohexyloxyacetyl) - amino-5-naphthol-7-sulphonic acid
2-(β-phenoxypropionyl)-amino -5- naphthol -7-sulphonic acid
2-N - ethyl-N-phenoxyacetyl-amino-5-naphthol-7-sulphonic acid
2-N-(2'-chlorophenoxyacetyl) - N - ethyl-amino-5-naphthol-7-sulphonic acid
2-(benzyloxyacetyl) - amino-5-naphthol -7- sulphonic acid
2-formylamino-5-naphthol-7-sulphonic acid
2-succinylamino-5-naphthol-7-sulphonic acid
2-N-ethyl - N - succinylamino-5-naphthol-7-sulphonic acid
2-(2'-chlorobenzoyl)amino -5- naphthol -7- sulphonic acid
2-benzoylamino-5-naphthol-7-sulphonic acid
2-N-benzoyl - N - ethylamino-5-naphthol-7-sulphonic acid
2-(benzene sulphonyl)amino-5-naphthol-7-sulphonic acid
2-(p-toluene sulphonyl)amino-5-naphthol-7-sulphonic acid
2 - (tetrahydronaphthalene-2'-sulphonyl)amino-5-naphthol-7-sulphonic acid
2-hexahydrobenzoylamino - 5 - naphthol-7-sulphonic acid
2-isopropyloxyacetylamino -5- naphthol -7- sulphonic acid
2-N-(phenoxyacetyl)-N-ethylamino-5-naphthol-7-sulphonic acid
2-ethoxyformylamino -5- naphthol -7- sulphonic acid
2-N-(p-toluene sulphonyl) - N - ethylamino - 5-naphthol-7-sulphonic acid
2-N-(p - toluene sulphonyl) - N - methylamino-5-naphthol-7-sulphonic acid
2-N-(2'-chlorobenzoyl) -N- ethylamino-5-naphthol-7-sulphonic acid
2-N-formyl-N-phenylamino-5-naphthol -7- sulphonic acid
2 - (3'-bromobenzoyl)amino-5-naphthol-7-sulphonic acid.

N-alkoxyacyl, N-alkoxyacyl-N-alkyl and N-alkoxyacyl-N-aryl derivatives of 2-amino-5-naphthol-7-sulphonic acid are obtainable by interaction between the latter or the appropriate N-alkyl or N-aryl derivative thereof, e. g., 2-N-ethylamino-5-naphthol-7-sulphonic acid or 2-N-phenylamino-5-naphthol-7-sulphonic acid, and the chloride or anhydride of the required alkoxyfatty acid, e. g., methoxyacetyl chloride or methoxy-acetic anhydride.

N-aryloxy-, -cycloalkoxy- and -aralkoxy-acyl derivatives of 2-amino-5-naphthol-7-sulphonic acid (or a 2-N-alkylamino-5-naphthol-7-sulphonic acid) are obtainable by interaction between the latter and the required aryloxy- cycloalkoxy- or aralkoxy-acyl chloride, e. g., phenoxyacetyl chloride, o-chlorophenoxy-acetyl chloride, cyclohexyloxyacetyl chloride and benzoyloxyacetyl chloride.

N-formyl, -succinyl, -benzoyl, -(benzene sulphonyl), -(p-toluene sulphonyl), -(tetrahydronaphthalene-2'-sulphonyl) and -hexahydrobenzoyl derivatives of 2-amino-5-naphthol-7-sulphonic acid (or a 2-N-aryl or -alkylamino-5-naphthol-7-sulphonic acid) are obtainable by interaction between the latter and formic acid in excess, or, in the presence of an acid-binding agent, succinic anhydride, benzoyl chloride, benzene sulphonyl chloride, p-toluene sulphonyl chloride, tetrahydronaphthalene-2-sulphonyl chloride or hexahydrobenzoyl chloride respectively.

The invention is illustrated, but not limited, by the following examples in which the parts are by weight.

*Example 1*

21.25 parts of 4-amino-1-N-ethyl-omega-chloroacetanilide are dissolved in a mixture of 300 parts of water and 25 parts of 36% hydrochloric acid and then a solution of 6.9 parts of sodium nitrite in 50 parts of water is added. The solution of the diazo compound so-obtained, after cooling to 5°–10° C. is added to a stirred and cooled mixture of 33.3 parts of the sodium salt of 2-methoxyacetylamino -5- naphthol -7- sulphonic acid, 80 parts of sodium chloride, 350 parts of water and 21 parts of anhydrous sodium carbonate. When coupling is complete, further sodium chloride is added to precipitate the dyestuff if necessary, and the latter is filtered off and dried.

The new dyestuff dyes wool from a dyebath containing sulphuric acid and Glauber's salt in reddish-orange shades, the dyeings having very good fastness to severe washing, milling and light.

The coupling can also be carried out in the presence of other mild neutralising agents such as sodium bicarbonate or sodium acetate instead of sodium carbonate.

*Example 2*

22.6 parts of 4-amino-2-N-ethyl-omega-chloroacet-toluidide are dissolved in a mixture of 400 parts of water and 25 parts of 36% hydrochloric acid and to the solution at 5°–10° C. there is added a solution of 6.9 parts of sodium nitrite in 50 parts of water. The solution of the diazo compound so-obtained is added with stirring to a cooled mixture of 33.3 parts of the sodium salt of 2-methoxyacetylamino-5-naphthol-7-sulphonic acid, 80 parts of sodium chloride, 350 parts of water and 21 parts of anhydrous sodium carbonate. The new dyestuff so-obtained is isolated and dried. It dyes wool in bright reddish-orange shades when applied from a dyebath containing sulphuric acid and Glauber's salt, the dyeings having very good fastness to severe washing, milling and light.

*Example 3*

26.65 parts of 4-amino-1-N-cyclohexyl-omega-chloroacetanilide are dissolved in a mixture of 350 parts of water and 25 parts of 36% hydrochloric acid. The solution is cooled to 15°–30° C. and 6.9 parts of sodium nitrite are added. The solution of the diazo compound is filtered, if necessary, and after cooling to 5°–10° C. is added with stirring to a cooled solution of 33.3 parts of the sodium salt of 2-methoxyacetylamino-5-naphthol-7-sulphonic acid in 400 parts of water, to which sufficient sodium carbonate or sodium bicarbonate has been added to keep the coupling medium alkaline.

The new dyestuff, after precipitation by addition of sodium chloride if necessary, is filtered off and dried. It dyes wool in dull reddish-orange shades when applied from a dyebath containing sulphuric acid and Glauber's salt, the dyeings having very good fastness to severe washing, milling and light.

Dyestuffs having very similar properties are obtained if the 2-methoxyacetylamino-5-naphthol-7-sulphonic acid is replaced by the equivalent weight of 2-ethoxyacetylamino-5-naphthol-7-sulphonic acid or 2-butoxyacetylamino-5-naphthol-7-sulphonic acid.

*Example 4*

22.6 parts of 4-amino-2-N-ethyl-omega-chloroacet-toluidide are diazotised as in Example 2. The cooled solution of the diazo compound is added to a cooled and stirred solution of 43 parts of the sodium salt of 2-(2'-chlorophenoxyacetyl)-amino-5-naphthol-7-sulphonic acid in 500 parts of water to which have been added 21 parts of anhydrous sodium carbonate. The dyestuff is isolated and dried. It dyes wool from an acid bath in bright reddish-orange shades of very good fastness to severe washing, milling and light.

If, instead of 22.6 parts of 4-amino-2-N-ethyl-omega-chloroacet-toluidide there is employed the same weight of 4-amino-1-N-isopropyl-omega-chloroacetanilide a dyestuff is obtained which yields on wool redder shades of orange, the dyeings having similar fastness properties.

*Example 5*

To an aqueous solution containing 28.65 parts of sodium 4-amino-omega-chloroacetanilide-3-sulphonate are added 35 parts of 36% hydrochloric acid followed by 6.9 parts of sodium nitrite. The solution of the diazo compound so-obtained is added to a stirred mixture of 33.3 parts of sodium 2-methoxyacetylamino-5-naphthol-7-sulphonate, 40 parts of crystallised sodium acetate and 450 parts of water at 10°–15° C. Stirring is continued until coupling is complete (about 1 hour) when the new deystuff is filtered off, washed with 10% aqueous sodium chloride and dried.

The new dyestuff dyes wool from an acid bath in scarlet shades, the dyeings having very good fastness to severe washing, milling, and light.

*Example 6*

28.5 parts of 4-amino-2-N-ethyl-omega-bromopropion-toluidide are dissolved in 400 parts of water and 25 parts of 36% hydrochloric acid. Then 6.9 parts of sodium nitrite are added. The solution of the diazo compound so-obtained is added to a stirred solution at 10°–15° C. of 40 parts of sodium 2-phenoxyacetylamino-5-naphthol-7-sulphonate in 600 parts of water to which 28 parts of sodium acetate crystals have been added. When coupling is complete the new dyestuff is filtered off and dried.

The new dyestuff dyes wool from a dyebath containing sulphuric acid and Glauber's salt in reddish orange shades of good fastness to severe washing, milling and light.

Dyestuffs having similar properties are obtained if the 28.5 parts of 4-amino-2-N-ethyl-omega-bromopropion-toluidide employed above are replaced by the same weight of 4-amino-2-N-ethyl-α-bromopropion-toluidide or by 24 parts of 4-amino-2-N-ethyl-omega-chloropropion-toluidide.

*Example 7*

To a solution of 25.65 parts of 4-amino-1-N-β-ethoxyethyl-omega-chloroacetanilide in 300 parts of water and 25 parts of 36% hydrochloric acid are added 6.9 parts of sodium nitrite. The solution of the diazo compound so-obtained is added gradually to a stirred solution at 10°–15° C. of 33.3 parts of sodium 2-methoxy-acetylamino-5-naphthol-7-sulphonate in 500 parts of water to which have been added 28 parts of sodium acetate crystals. When coupling is complete the new dyestuff is completely precipitated by addition of 60 parts of sodium chloride, filtered off, washed with 10% aqueous sodium chloride and dried. It dyes wool from an acid dyebath in reddish orange shades, the dyeings having good fastness to severe washing, milling and light.

*Example 8*

22.65 parts of 4-amino-1-N-isopropyl-omega-chloro-acetanilide are dissolved in 300 parts of water and 25 parts of 36% hydrochloric acid and 6.9 parts of sodium nitrite are then added. The solution of the diazo compound so obtained is gradually added to a stirred solution of 40.9 parts of sodium 2-benzyloxyacetylamino-5-naphthol-7-sulphonate and 28 parts of crystallised sodium acetate in 650 parts of water. When coupling is complete the new dyestuff is filtered off, washed with 5% aqueous sodium chloride and dried.

It dyes wool from an acid bath in orange shades, the dyeings having very good fastness to severe washing and milling and good fastness to light.

*Example 9*

21.25 parts of 4-amino-1-N-ethyl-omega-chloroacetanilide are dissolved in a mixture of 300 parts of water and 25 parts of 36% hydrochloric acid and to the resulting solution there is added a solution of 6.9 parts of sodium nitrite in 50 parts of water.

The solution of the diazo compound so obtained is cooled to 5°–10° C. and added to a cooled and stirred mixture of 36.5 parts of the sodium salt of 2-benzoyl-amino-5-naphthol-7-sulphonic acid, 500 parts of water and 21 parts of anhydrous sodium carbonate. Coupling is completed very quickly. The dyestuff is salted out with sodium chloride if necessary, filtered off and dried.

The new dyestuff forms a reddish orange powder, soluble in water, and dyes wool from an acid bath in reddish-orange shades, the dyeings having very good fastness to severe washing and milling.

The coupling can also be carried out in the presence of other mild acid-binding agents such as sodium acetate or sodium bicarbonate instead of sodium carbonate.

*Example 10*

22.6 parts of 4-amino-2-N-ethyl-omega-chloroacet-toluidide are dissolved in a mixture of 400 parts of water and 25 parts of 36% hydrochloric acid and diazotised at 5°–10° C. by the addition of a solution of 6.9 parts of sodium nitrite in 50 parts of water. The solution of the diazo compound so obtained is added gradually to a cooled and stirred solution of 39.3 parts of the sodium salt of 2-N-benzoyl-N-ethyl-amino-5-naphthol-7-sulphonic acid in 600 parts of water to which have been added 21 parts of anhydrous sodium carbonate.

The new dyestuff is isolated and dried. It dyes wool from an acid bath in reddish-orange shades, the dyeings having very good fastness to severe washing, and milling, and good fastness to light.

*Example 11*

22.65 parts of 4-amino-1-N-ethyl-omega-chloropropionanilide are dissolved in 350 parts of water and 25 parts of 36% hydrochloric acid. 6.9 parts of sodium nitrite are then added. The solution of the diazo compound so obtained is added gradually to a stirred mixture at 5–10° C.

of 41.5 parts of the sodium salt of 2-(p-toluene sulphonyl)-amino-5-naphthol-7-sulphonic acid, 600 parts of water and 28 parts of crystallised sodium acetate. When coupling is complete the new dyestuff is isolated and dried.

The new dyestuff dyes wool from a dyebath containing sulphuric acid and Glauber's salt in reddish orange shades, the dyeings having good fastness to severe washing, milling and light.

A dyestuff having similar properties is obtained if 27.1 parts of 4-amino-1-N-ethyl-omega-bromopropionanilide are used instead of the 22.65 parts of 4-amino-1-N-ethyl-omega-chloropropionanilide.

Example 12

26.65 parts of 4-amino-1-N-cyclohexyl-omega-chloroacetanilide are dissolved in a mixture of 350 parts of warm water and 25 parts of 36% hydrochloric acid. The solution is cooled to 15°–30° C. and 6.9 parts of sodium nitrite are added. The solution of the diazo compound is filtered, if necessary, and after cooling to 5°–10° C. is added gradually to a stirred and similarly cooled solution of 33.3 parts of sodium 2-ethoxyformylamino-5-naphthol-7-sulphonate in 600 parts of water to which 28 parts of sodium acetate crystals have been added. Stirring is continued until coupling is complete. The suspension of the new dyestuff is then rendered alkaline with sodium carbonate, the dyestuff filtered off, washed with 5% aqueous sodium chloride and dried.

The new dyestuff forms a reddish orange powder, soluble in water, and dyes wool from a dyebath containing sulphuric acid and Glauber's salt in orange shades, the dyeings having very good fastness to severe washing and milling and good fastness to light.

If the equivalent weight of sodium 2-benzenesulphonylamino- or 2-(p-toluene sulphonyl)-amino-5-naphthol-7-sulphonate is used in place of the sodium 2-ethoxyformylamino-5-naphthol-7-sulphonate, dyestuffs yielding somewhat redder shades of orange and having similar fastness properties are obtained.

Example 13

26.65 parts of 4-amino-1-N-cyclohexyl-omega-chloroacetanilide are diazotised as in Example 12 and the solution of the diazo compound cooled to 5–10° C. added to a stirred and similarly cooled aqueous solution of 38.3 parts of the disodium salt of 2-succinylamino-5-naphthol-7-sulphonic acid containing excess of sodium carbonate. The dyestuff so obtained is precipitated by addition of sodium chloride, filtered off, washed with 20% aqueous sodium chloride and dried.

The new dyestuff forms a dull scarlet powder, soluble in water, and dyes wool from an acid bath in reddish orange shades, the dyeings having very good fastness to severe washing and good fastness to light.

A dyestuff yielding slightly redder shades and having very similar fastness properties is obtained if the disodium salt of 2-succinylamino-5-naphthol-7-sulphonic acid used above is replaced by 36.5 parts of the sodium salt of 2-benzoylamino-5-naphthol-7-sulphonic acid.

Example 14

27.45 parts of 3-amino-1-N-benzyl-omega-chloroacetanilide are dissolved in 400 parts of water and 25 parts of 36% hydrochloric acid and 6.9 parts of sodium nitrite added. The solution of the diazo compound so-obtained, after filtration if necessary, is added to a stirred solution at 10°–15° C. of 44.3 parts of the sodium salt of 2-N-(p-toluenesulphonyl)-N-ethyl-amino-5-naphthol-7-sulphonic acid in 400 parts of water to which 28 parts of sodium acetate crystals have been added. When coupling is complete (after about 4 hours) the precipitated dyestuff is filtered off, washed with 5% aqueous sodium chloride and dried.

The new dyestuff forms a reddish orange powder, soluble in water, and dyes wool from an acid bath in orange shades, the dyeings having very good fastness to severe washing, milling and light.

If the sodium salt of 2-N-(p-toluenesulphonyl)-N-ethylamino-5-naphthol-7-sulphonic acid is replaced by the corresponding weight of sodium 2-N-(p-toluenesulphonyl)-N-methyl-amino-5-naphthol-7-sulphonate, a dyestuff having similar properties is obtained.

Example 15

To a solution of 34.25 parts of the sodium salt of 4-amino-1-N-n-butyl-omega-chloroacetanilide-2-sulphonic acid in 200 parts of water are added 35 parts of 36% hydrochloric acid and then 6.9 parts of sodium nitrite. The solution of the diazo compound so-obtained is filtered if necessary and then added at 10–15° C. to a stirred solution of 28.9 parts of the sodium salt of 2-formylamino-5-naphthol-7-sulphonic acid in 500 parts of water to which 40 parts of sodium acetate crystals have been added. Coupling is rapid and, when complete, the dyestuff is precipitated by addition of sodium chloride, filtered off and dried.

The new dyestuff dyes wool from a dyebath containing sulphuric acid and sodium sulphate in yellowish orange shades, the dyeings having good fastness to severe washing, milling and light.

The invention is further illustrated by the examples listed in the following table:

| Example No. | Diazo component | Coupling component | Acid binding agent used in coupling | Shade given by the dyestuff on wool |
|---|---|---|---|---|
| 16 | 3-amino-omega-chloroacetanilide-4-sulphonic acid. | 2-methoxyacetylamino-5-naphthol-7-sulphonic acid. | Sodium acetate | Orange. |
| 17 | 4-amino-1-N-ethyl-omega-chloroacetanilide | 2-N-methoxyacetyl-N-ethylamino-5-naphthol-7-sulphonic acid. | do | Reddish-orange. |
| 18 | 4-amino-1-N-ethyl-omega-chloropropionanilide. | 2-methoxyacetyl-amino-5-naphthol-7-sulphonic acid. | do | Do. |
| 19 | do | 2-phenoxyacetyl-amino-5-naphthol-7-sulphonic acid. | Sodium carbonate | Do. |
| 20 | 4-amino-2-N-ethyl-omega-chloropropion-toluidide. | 2-(2'-chlorophenoxyacetyl)-amino-5-naphthol-7-sulphonic acid. | do | Do. |
| 21 | do | 2-methoxyacetylamino-5-naphthol-7-sulphonic acid. | Sodium acetate | Bright reddish orange. |
| 22 | 4-amino-1-N-cyclohexyl-omega-chloroacetanilide. | 2-N-(phenoxyacetyl)-N-ethylamino-5-naphthol-7-sulphonic acid. | Sodium carbonate | Reddish-orange. |
| 23 | 4-amino-1-N-phenyl-omega-chloroacetanilide. | 2-methoxyacetylamino-5-naphthol-7-sulphonic acid. | Sodium acetate | Dull reddish-orange. |
| 24 | 4-amino-2-N-benzyl-omega-chloroacet-toluidide. | do | do | Orange. |
| 25 | 3-amino-1-N-benzyl-omega-chloroacetanilide | do | do | Do. |

| Example No. | Diazo component | Coupling component | Acid binding agent used in coupling | Shade given by the dyestuff on wool |
|---|---|---|---|---|
| 26 | 4-amino-1-N-isopropyl-omega-chloroacetanilide. | 2-N-methoxyacetyl-N-ethylamino-5-naphthol-7-sulphonic acid. | Sodium acetate | Orange. |
| 27 | ----do---- | 2-N-methoxyacetyl-N-phenylamino-5-naphthol-7-sulphonic acid. | Sodium carbonate | Dull reddish orange. |
| 28 | 4-amino-1-N-sec.butyl-omega-chloroacetanilide. | 2-methoxyacetylamino-5-naphthol-7-sulphonic acid. | Sodium acetate | Bright reddish orange. |
| 29 | ----do---- | 2-(phenoxyacetyl)-amino-5-naphthol-7-sulphonic acid. | ----do---- | Orange. |
| 30 | ----do---- | 2-isopropyloxyacetylamino-5-naphthol-7-sulphonic acid. | ----do---- | Bright reddish orange. |
| 31 | 4-amino-1-N-ethyl-omega-chloroacetanilide. | 2-succinylamino-5-naphthol-7-sulphonic acid. | ----do---- | Orange. |
| 32 | ----do---- | 2-(2'-chlorobenzoyl)-amino-5-naphthol-7-sulphonic acid. | Sodium carbonate | Reddish orange. |
| 33 | 4-amino-1-N-ethyl-omega-chloroacetanilide. | 2-N-(2'-chlorobenzoyl)-N-ethylamino-5-naphthol-7-sulphonic acid. | ----do---- | Do. |
| 34 | ----do---- | 2-(p-toluene-sulphonyl)-amino-5-naphthol-7-sulphonic acid. | Sodium bicarbonate. | Do. |
| 35 | ----do---- | 2-ethoxyformylamino-5-naphthol-7-sulphonic acid. | Sodium carbonate | Orange. |
| 36 | 4-amino-1-N-isopropyl-omega-chloroacetanilide. | 2-succinylamino-5-naphthol-7-sulphonic acid. | ----do---- | Do. |
| 37 | 4-amino-2-N-ethyl-omega-chloroacet-toluidide. | ----do---- | Sodium acetate | Bright orange. |
| 38 | ----do---- | 2-(2'-chlorobenzoylamino-5-naphthol-7-sulphonic acid. | Sodium carbonate | Do. |
| 39 | 4-amino-2-N-ethyl-omega-chloropropionanilide. | ----do---- | Sodium acetate | Do. |
| 40 | 4-amino-1-N-benzyl-omega-chloroacetanilide. | 2-ethoxyformylamino-5-naphthol-7-sulphonic acid. | ----do---- | Reddish orange. |
| 41 | 4-amino-1-N-phenyl-omega-chloroacetanilide | 2-N-benzoyl-N-ethyl-amino-5-naphthol-7-sulphonic acid. | ----do---- | Dull scarlet. |
| 42 | ----do---- | 2-N-formyl-N-phenyl-amino-5-naphthol-7-sulphonic acid. | ----do---- | Do. |
| 43 | 4-amino-2-N-benzyl-omega-chloroacetanisidide. | 2-succinylamino-5-naphthol-7-sulphonic acid. | Sodium carbonate | Scarlet. |
| 44 | 4-amino-1-N-sec-butyl-omega-chloroacetanilide. | 2-benzoylamino-5-naphthol-7-sulphonic acid. | Sodium acetate | Reddish orange. |
| 45 | 4-amino-1-N-n-butyl-omega-chloroacetanilide. | 2-hexahydrobenzoylamino-5-naphthol-7-sulphonic acid. | ----do---- | Orange. |
| 46 | 3-amino-omega-chloroacet-anilide-4-sulphonic acid. | 2-N-benzoyl-N-ethyl-amino-5-naphthol-7-sulphonic acid. | ----do---- | Brownish orange. |
| 47 | 3-amino-omega-chloropropion-anilide-4-sulphonic acid. | 2-succinylamino-5-naphthol-7-sulphonic acid. | ----do---- | Yellowish orange. |
| 48 | 4-amino-1-N-cyclohexyl-omega-chloroacetanilide. | 2-formylamino-5-naphthol-7-sulphonic acid. | Sodium carbonate | Reddish orange. |
| 49 | ----do---- | 2-(2'-chlorobenzoyl)-amino-5-naphthol-7-sulphonic acid | ----do---- | Do. |
| 50 | ----do---- | 2-(3'-bromobenzoyl)-amino-5-naphthol-7-sulphonic acid. | Sodium acetate | Do. |
| 51 | 4-amino-1-N-cyclohexyl-omega-chloroacetanilide. | 2-(tetrahydronaphthalene-2'-sulphonyl)-amino-5-naphthol-7-sulphonic acid | Sodium carbonate | Do. |
| 52 | ----do---- | 2-N-formyl-N-phenylamino-5-naphthol-7-sulphonic acid. | ----do---- | Very reddish orange. |
| 53 | ----do---- | 2-N-succinyl-N-ethyl-amino-5-naphthol-7-sulphonic acid. | ----do---- | Do. |
| 54 | 4-amino-1-N-cyclohexyl-omega-chloropropionanilide. | 2-N-succinylamino-5-naphthol-7-sulphonic acid. | Sodium acetate | Reddish orange. |

We claim:
The azo dye which in the form of its acid is represented by the formula

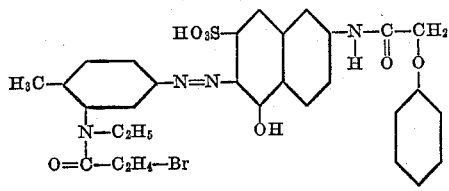

ARTHUR HOWARD KNIGHT.
WILLIAM ELLIOT STEPHEN.